(12) United States Patent
Yoshikawa et al.

(10) Patent No.: US 7,962,020 B2
(45) Date of Patent: Jun. 14, 2011

(54) IMAGING APPARATUS

(75) Inventors: Koichi Yoshikawa, Kanagawa (JP); Noriyuki Yamashita, Tokyo (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 12/059,661

(22) Filed: Mar. 31, 2008

(65) Prior Publication Data
US 2008/0240693 A1 Oct. 2, 2008

(30) Foreign Application Priority Data

Apr. 2, 2007 (JP) ................................. 2007-096607

(51) Int. Cl.
*G03B 37/02* (2006.01)
(52) U.S. Cl. ........................... 396/20; 396/140; 396/382
(58) Field of Classification Search ................... 396/20, 396/140, 149, 325, 382
See application file for complete search history.

(56) References Cited

U.S. PATENT DOCUMENTS

| | | | | |
|---|---|---|---|---|
| 4,044,377 | A * | 8/1977 | Bowerman | 348/136 |
| 5,937,212 | A * | 8/1999 | Kurahashi et al. | 396/20 |
| 7,268,805 | B2 * | 9/2007 | Yoshikawa et al. | 348/218.1 |
| 7,463,305 | B2 * | 12/2008 | Wada | 348/373 |
| 2004/0051805 | A1 * | 3/2004 | Yoshikawa et al. | 348/335 |
| 2004/0233275 | A1 * | 11/2004 | Tomita | 348/51 |

FOREIGN PATENT DOCUMENTS

| | | |
|---|---|---|
| JP | 53-132562 | 10/1978 |
| JP | SHO62-045425 | 2/1987 |
| JP | 08-292356 | 11/1996 |
| JP | HEI 11-093936 A | 4/1999 |
| JP | 2000-078453 | 3/2000 |
| JP | 2002-314867 | 10/2002 |
| JP | 2003-162108 | 6/2003 |
| JP | 2003-156080 A | 5/2005 |
| JP | 2006-030664 | 2/2006 |
| JP | 2006-178097 | 7/2006 |
| JP | 2000-337399 | 10/2009 |

OTHER PUBLICATIONS machine translation of JP08-292356.*
Japanese Office Action issued on Mar. 10, 2009 corresponding to JP Patent Application No. 2007-096607.
Japanese Patent Office Action corresponding to Japanese Serial No. P2007-096607 dated Jul. 14, 2009.
Japanese Patent Office, Office Action issued in Patent Application JP 2007-096607, on Dec. 8, 2009.

* cited by examiner

*Primary Examiner* — Rodney E Fuller
*Assistant Examiner* — Linda B Smith
(74) *Attorney, Agent, or Firm* — SNR Denton US LLP

(57) ABSTRACT

An imaging apparatus includes an imaging device, and an optical system configured to image light from an imaging subject on the imaging device. The optical system includes a group of lenses and an aperture diaphragm. When NP point is defined as a point where an extended linear component in an object space of a principal ray located in a Gauss region and selected from among principal rays passing through a center of the aperture diaphragm of the optical system crosses an optical axis of the optical system, D represents a diameter of a lens at the closest side to the imaging subject, and LN represents a distance from a lens surface of the lens at the closest side to the imaging subject to the NP point, a formula; $0 \leq LN \leq D$ (1) is satisfied.

4 Claims, 5 Drawing Sheets

IMAGING APPARATUS

CROSS REFERENCES TO RELATED APPLICATIONS

The invention contains subject matter related to Japanese Patent Application JP 2007-096607 filed in the Japanese Patent Office on Apr. 2, 2007, the entire contents of which being incorporated herein by reference.

BACKGROUND OF THE INVENTION

1. Field of the Invention

The invention relates to an imaging apparatus for capturing dynamic and/or static images in wide areas, suitably adapted to a monitoring camera, and the like.

2. Description of the Related Art

In a monitoring camera, and the like, a technology of scanning a camera with a telescopic lens attached is employed for capturing high-resolution dynamic and/or static images in wide areas.

When scanning a camera for capturing dynamic and/or static images in wide areas, the camera is rotated around a point or line in a horizontal direction and in a vertical direction to change the direction of the camera, and thereby capturing the dynamic and/or static images in wide areas in the horizontal direction (panning) and in the vertical direction (tilting). Such a camera capable of panning and tilting is called a pan and tilt camera.

Also, when capturing dynamic or static images in wide areas, it is conceivable to join dynamic and/or static images captured in respective directions.

However, when rotating a camera, unless the center point or line for rotation is appropriately selected, it occurs that joining is difficult or a non-captured dead angle exists.

As the monitoring camera, if a dead angle exists, the camera may not have a sufficient monitoring function.

To eliminate dead angles in captured dynamic and/or static images, it may be necessary to rotate a camera around an NP point (non-parallax point) of an optical system of the camera. The NP point is defined as a point where an extended linear component in an object space of a principal ray located in a Gauss region, selected from among a large number of principal rays passing through the center of an aperture diaphragm of an optical system of a camera, crosses an optical axis of the optical system.

It is possible to join dynamic and/or static images respectively taken with a plurality of cameras, without causing parallax, by making NP points of optical systems of the cameras (actual dynamic and/or static images or virtual dynamic and/or static images reflected by mirrors, etc.) agree with each other (see, for example, Japanese Unexamined Patent Application Publications No. 2003-162018 and No. 2006-30664).

When rotating a camera as described above, by rotating the camera around an NP point serving as a rotation center, it is possible to join dynamic and/or static images captured in respective directions, without causing parallax. Further, it is possible not to cause dead angles by not causing parallax.

SUMMARY OF THE INVENTION

In a common telescopic lens, it is often the case that the NP point exists at the rear part of an imaging device, and as the focal distance is longer to be more telescopic, the distance from a lens closest to the side of an imaging subject (front lens) to the NP point increases.

If such a camera in which the distance from a front lens to an NP point is relatively long is to be rotated around the NP point, the movable part of the camera is relatively large, resulting in increasing the occupied volume.

Also, from the viewpoint of securing dust-proof and water-proof, or safety against a human body, rather than exposing the camera, it is preferable to cover the camera with a cover member made of a transparent material such as resin, glass, etc.

Further, when rotating a camera, in which the distance from a front lens to an NP point is relatively long, around the NP point, a relatively large cover member is necessary.

Furthermore, to capture high quality dynamic and/or static images with the camera, it is necessary to make the cover member with accuracy in the thickness and the optical characteristic thereof so that deterioration in the optical performance is prevented as much as possible.

If attempts have been made to achieve a good balance between the above-described requirements, the cover member is relatively expensive, and it is difficult to bring the camera into a commercial product as a monitoring camera as a result.

To address the above-described and other problems, the invention provides a small-sized imaging apparatus capable of capturing high quality dynamic and/or static images in wide areas.

According to an embodiment of the invention, an imaging apparatus includes an imaging device, and an optical system configured to image light from an imaging subject on the imaging device. The optical system includes a group of lenses and an aperture diaphragm. When NP point is defined as a point where an extended linear component in an object space of a principal ray located in a Gauss region and selected from among principal rays passing through a center of the aperture diaphragm of the optical system crosses an optical axis of the optical system, D represents a diameter of a lens at the closest side to the imaging subject, LN represents a distance from a lens surface of the lens at the closest side to the imaging subject to the NP point, and a value of the distance LN is defined as positive when the NP point is located at a point behind the lens surface of the lens of the lens at the closest side to the imaging subject and as negative when the NP point is located in front of the lens surface of the lens at the closest side to the imaging subject, a formula; $0 \leq LN \leq D$ (1) is satisfied.

According to the imaging apparatus according to an embodiment of the invention, by configuring the apparatus such that the distance LN from the lens surface of the lens at the closest side to the imaging subject to the NP point satisfies the formula; $0 \leq LN \leq D$ (1), when the optical system of the imaging apparatus is to be rotated around the NP point, it is possible to configure the movable part of the apparatus at the imaging subject side of the NP point relatively small. Thereby, the whole of the imaging apparatus including the movable part can be made relatively small.

At this time, by rotating the optical system of the imaging apparatus around the NP point, it is possible to join dynamic and/or static images captured in respective angles, without causing parallax and dead angles, so that it is possible to capture dynamic and/or static images in wide areas, from macro to infinite distance, without causing parallax and dead angles.

Further, even when a transparent cover member is provided for dust-proof, etc. at the imaging subject side of the imaging apparatus, the cover member need not be made larger.

Thus, according to an embodiment of the invention, because the whole of an imaging apparatus including a movable part can be made compact, and further because even when a transparent cover member is provided, the cover member need not be made larger, the imaging apparatus for capturing dynamic and/or static images in wide areas can be made compact.

Further, an embodiment of the invention, when the cover member is provided, because the cover member need not be made larger, even when the material of the cover member is glass for suppressing deterioration in the optical performance such as occurrence of aberration, etc., the cover member can be mass-produced at a relatively low cost. That is, it is possible to use the cover member that is superior in the optical performance and that is yet relatively inexpensive.

Thereby, it is possible to capture dynamic and/or static images in wide areas having less deterioration in the optical performance, in satisfactory quality.

Thus, according to the invention, it is possible to realize a small-sized imaging apparatus that can capture dynamic and/or static images in wide areas and that can obtain satisfactory image quality.

DESCRIPTION OF THE PREFERRED EMBODIMENTS

Examples of embodiments of the invention will be described below with reference to drawings.

Figure 1:
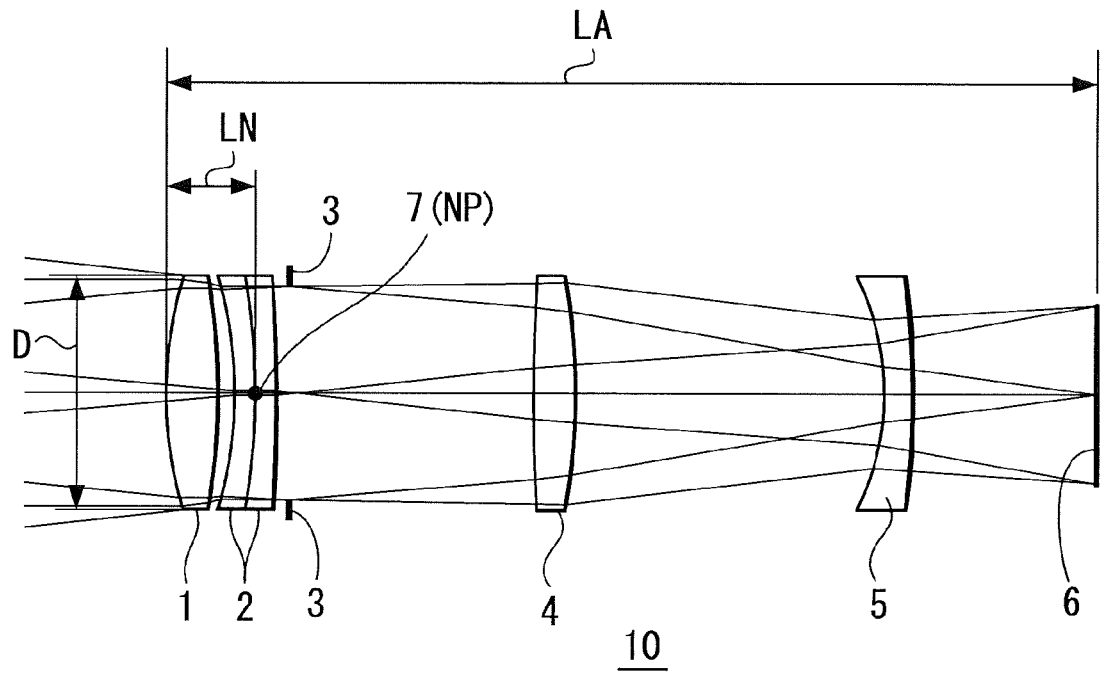
FIG. 1 is a schematic configuration diagram (cross section of the principal part) of an example of an imaging apparatus according to an embodiment of the invention.

FIG. 1 is a cross section illustrating the principal part of an example of an imaging apparatus according to an embodiment of the invention. An imaging apparatus (camera) 10 includes a front lens (a lens at the closest side to the imaging subject) 1, a two-piece set lens (combined lens) 2, an aperture diaphragm 3, a lens 4 that is convex on both sides thereof, a lens 5 that is concave on the imaging subject side, and an imaging device 6, which are arranged in this order from the imaging subject side. In this example, the front lens 1, the two-piece set lens 2, the aperture diaphragm 3, the lens 4, and the lens 5 constitute an optical system of the imaging apparatus 10.

The front lens 1, the two-piece set lens 2, the aperture diaphragm 3, the lens 4, and the lens 5, constituting the optical system, and the imaging device 6 are housed in a camera body (camera barrel, etc.) not illustrated.

For the imaging device 6, various types of solid-state imaging devices can be used, such as a CCD solid-state imaging device, a MOS-type solid-state imaging device, a CMOS-type solid-state imaging device, etc.

Light from an imaging subject passes through the front lens 1 located at the forefront of the imaging apparatus 10, and passes through the combined lens 2 and the aperture diaphragm 3, and is imaged on the imaging device 6, after passing through the lens 4, and the lens 5 located at the closest side of the imaging device 6.

The space in front of the front lens 1 (in FIG. 1, the left side of the front lens 1) is called an object space.

The point where when a principal ray among the principal rays passing through the center of the aperture diaphragm 3, that is located close to the optical axis of the optical system (in a Gauss region) and that is in the object space, is extended, the extended principal ray crosses the optical axis is defined as an NP point 7.

The imaging apparatus 10 in this embodiment is configured to satisfy the following formula; $0 \leq LN \leq D$ (1), wherein D represents the diameter of the front lens 1, LN represents the distance from the lens surface of the front lens 1 to the NP point 7, and a value of the distance LN is defined as positive when the NP point is located at a point behind the lens surface of the lens at the closest side to the imaging subject and as negative when the NP point is located in front of the lens surface of the lens at the closest side to the imaging subject. The above-described lens surface of the front lens 1 is the surface at the side of the imaging subject of the front lens 1.

As illustrated in FIG. 1, it is apparent that LN<D is satisfied, so that the formula (1) is satisfied.

As the design condition for the imaging apparatus 10 in this embodiment, for example, an optical system of a telescopic lens with an image angle of about 11 deg. is provided, and the diameter D of the front lens 1 may be set at 7.8 mm (D=7.8 mm), the lens length LA from the lens surface of the front lens 1 to the imaging device 6 may be set at 30.9 mm (LA=30.9 mm), and the distance LN from the lens surface of the front lens 1 to the NP point 7 may be set at 3.3 mm (LN=3.3 mm).

At this time, because LN<D is satisfied, the formula (1) is satisfied.

Accordingly, the imaging apparatus 10 in this embodiment satisfies the formula (1).

Further, the imaging apparatus 10 in this embodiment is configured to rotate around the NP point 7.

Specifically, the optical system including the lens 1, the lens 2, the lens 4, the lens 5, and the aperture diaphragm 3, etc., and the imaging device 6 are housed in a container such as a lens barrel, etc., and a drive device is provided to the container such that the container can be driven to rotate around the NP point 7.

Thereby, the imaging apparatus 10 can be driven to rotate to scan to capture dynamic and/or static images in wide areas.

Also, for securing dust-proof and waterproof, or safety for the human body, it is preferable to provide a transparent cover member at the imaging subject side of the front lens 1 of the imaging apparatus 10.

More preferably, the cover member may be made of glass to suppress deterioration in the optical performance due to the cover member (such as occurrence of aberration, etc.).

The shape of the cover member may be selected so as not to influence the optical performance. For example, the cover member may be formed in a sphere centered on the NP point 7 serving as the rotation center.

According to the imaging apparatus 10 in this embodiment configured as described above, even when rotating the imaging apparatus 10 to scan, if the optical system (the lenses 1, 2, 4, 5 and the aperture diaphragm 3) is rotated around the NP point 7, parallax and dead angles are not caused, and it is possible to join dynamic and/or static images captured in respective angles. Thereby, it is possible to capture dynamic and/or static images in wide areas, from macro to infinite distance, without causing parallax and dead angles.

Further, by satisfying the formula (1), when the optical system of the imaging apparatus 10 is to be rotated around the NP point 7, it is possible to make the movable part at the imaging subject side of the imaging apparatus 10 relatively small.

Thereby, it is possible to make relatively small the whole of the imaging apparatus 10 including the movable part.

Further, even when a transparent cover member is provided at the imaging subject side of the imaging apparatus 10 for dust-proof, etc., the cover member does not need to be made larger, so that it is possible to realize a small-sized pan and tilt camera.

Because the cover member does not need to be made larger, even if the cover member is made of glass for suppressing deterioration in the optical performance such as occurrence of aberration, etc., it is possible to mass-produce the cover members at a relatively low cost. That is, it is possible to use a cover member that is superior in the optical performance and inexpensive.

Figure 2:
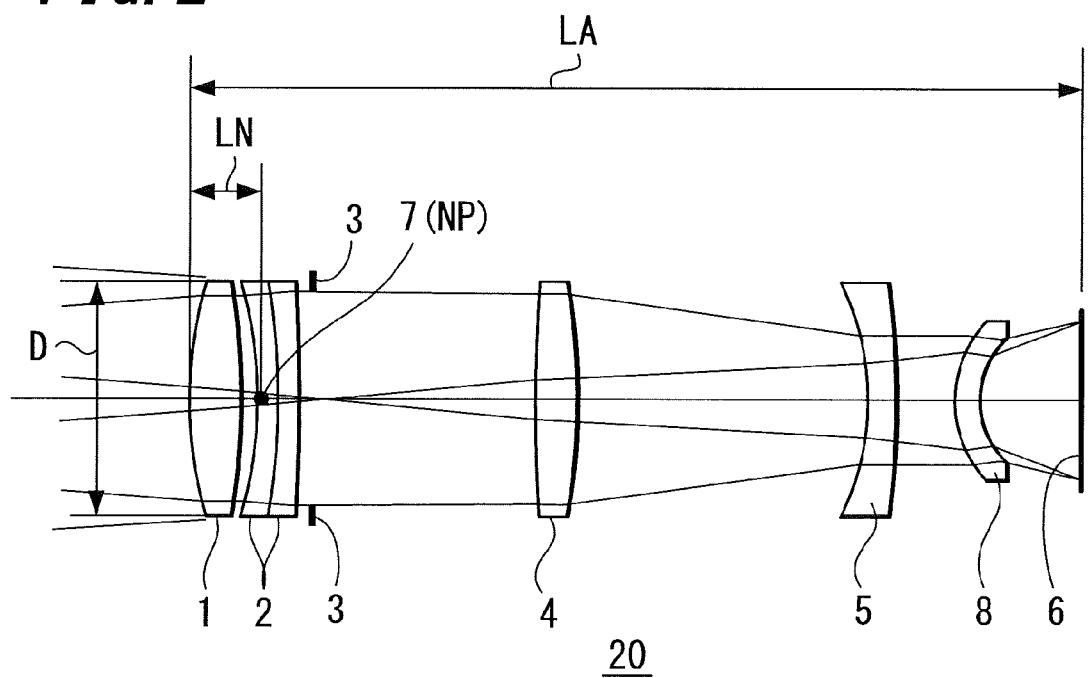
FIG. 2 is a schematic configuration diagram (cross section of the principal part) of an example of an imaging apparatus according to another embodiment of the invention.

FIG. 2 is a cross section illustrating the principal part of an example of an imaging apparatus according to another embodiment of the invention.

An imaging apparatus 20 illustrated in FIG. 2 includes a conversion lens 8 in addition to the lenses 1, 2, 4 and 5 of the imaging apparatus 10 in the previous embodiment illustrated in FIG. 1 so as to have a variable magnification larger than the imaging apparatus 10 in the previous embodiment.

Light from an imaging subject passes through the front lens 1 located at the forefront of the imaging apparatus 20, the combined lens 2, and the aperture diaphragm 3, and is imaged on the imaging device 6, after passing through the lens 4, the lens 5, and the conversion lens 8 having the role of changing the focal distance at the closest side of the imaging device 6.

The imaging apparatus 20 in this embodiment is also configured to satisfy the above-described formula; $0 \leq LN \leq D$ (1).

As illustrated in FIG. 2, it is apparent that LN<D is satisfied, so that the formula (1) is satisfied.

As the design condition for the imaging apparatus 20 in this embodiment, for example, an optical system of a telescopic lens with an image angle of about 10 deg. is provided. Then, in substantially the same manner as the imaging apparatus 10 in the previous embodiment, the diameter D of the front lens 1 may be set at 7.8 mm (D=7.8 mm), the lens length LA from the lens surface of the front lens 1 to the imaging device 6 may be set at 30.9 mm (LA=30.9 mm), and the distance LN from the lens surface of the front lens 1 to the NP point 7 may be set at 3.3 mm (LN=3.3 mm).

At this time, because LN<D is satisfied, the formula (1) is satisfied.

Accordingly, the imaging apparatus 20 in this embodiment satisfies the formula (1).

Further, the imaging apparatus 20 in this embodiment is configured to rotate around the NP point 7.

Specifically, the optical system including the lens 1, the lens 2, the lens 4, the lens 5, the lens 8, and the aperture diaphragm 3, etc., and the imaging device 6 are housed in a container such as a lens barrel, etc., and a drive device is provided to the container such that the container can be driven to rotate around the NP point 7.

Thereby, the imaging apparatus 20 can be driven to rotate to scan to capture dynamic and/or static images in wide areas.

Also, for dust-proof and waterproof, or securing safety for the human body, it is preferable to provide a transparent cover member at the imaging subject side of the front lens 1 of the imaging apparatus 20.

More preferably, the cover member may be made of glass to suppress deterioration in the optical performance due to the cover member (such as occurrence of aberration, etc.).

The shape of the cover member may be selected so as not to influence the optical performance. For example, the cover member may be formed in a sphere centered on the NP point 7 serving as the rotation center.

According to the imaging apparatus 20 in this embodiment configured as described above, even when rotating the imaging apparatus 20 to scan, if the optical system (the lenses 1, 2, 4, 5 and 8 and the aperture diaphragm 3) is rotated around the NP point 7, parallax and dead angles are not caused, and it is possible to join dynamic and/or static images captured in respective angles. Thereby, it is possible to capture dynamic and/or static images in wide areas, from macro to infinite distance, without causing parallax and dead angles.

Further, by satisfying the formula (1), when the optical system of the imaging apparatus 20 is to be rotated around the NP point 7, it is possible to make the movable part at the imaging subject side of the imaging apparatus 10 relatively small.

Thereby, it is possible to make relatively small the whole of the imaging apparatus 20 including the movable part.

Furthermore, even when a transparent cover member is provided at the imaging subject side of the imaging apparatus 20 for dust-proof, etc., the cover member need not be made larger, so that it is possible to realize a small-sized pan and tilt camera.

Because the cover member need not be made larger, even if the cover member is made of glass for suppressing deterioration in the optical performance such as occurrence of aberration, etc., it is possible to mass-produce the cover members at a relatively low cost. That is, it is possible to use a cover member that is superior in the optical performance and inexpensive.

Note that when applying an embodiment of the invention to the imaging apparatus provided with a variable magnification optical system capable of changing the focusing distance as in the imaging apparatus 20 in this embodiment, it is preferable that the change in the distance LN when the focusing distance is changed, that is, the change in the position of the NP point 7 when the focusing distance is changed, is within 20 mm.

It is because that if the change in the position of the NP point 7 is relatively large, there is a possibility that it results in causing parallax and dead angles in a certain focusing distance.

When configuring a pan and tilt camera with the imaging apparatus according to an embodiment of the invention, as the value of the distance LN from the lens surface of a front lens at the closest side to the imaging subject to the NP point becomes closer to 0, it is only needed to rotate the camera around the neighborhood of the front lens, so that it is possible to make the cover member relatively small.

Here, description is made about that by satisfying the formula (1), the cover member need not be made larger and it is possible to realize a small-sized pan and tilt camera.

Specifically, comparative description is provided with respect to the configuration of an imaging apparatus for the case that the distance LN from the surface of a front lens to an NP point is equal to one-half of the diameter D of the front lens (LN=0.5D) and the case that the distance LN is equal to the diameter D (LN=D), both satisfying the formula (1), and the case that the distance LN is equal to twice the diameter D (LN=2D), which does not satisfy the formula (1).

Figure 3:
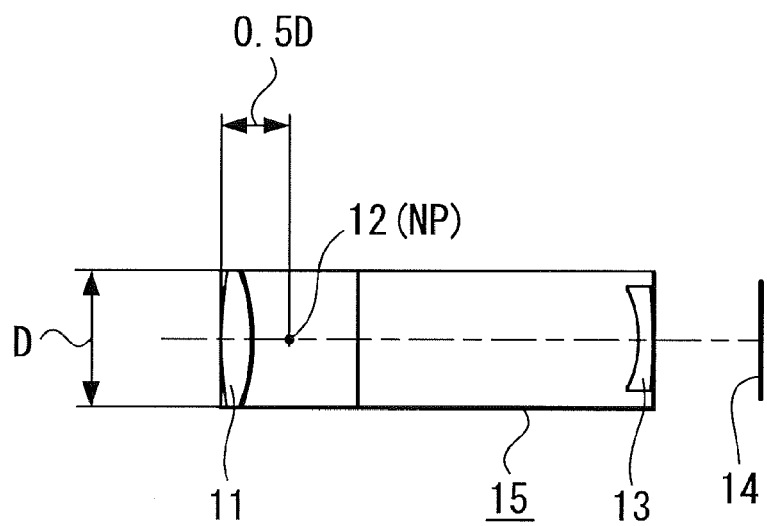
FIG. 3 is a schematic configuration diagram of an example of an imaging apparatus in which the distance LN from the surface of a front lens to an NP point is equal to one-half of the diameter D of the front lens (LN=0.5D).

FIG. 3 illustrates an example of an imaging apparatus in which LN=0.5D. In FIG. 3, the illustration of the optical system is simplified as compared with that of FIG. 1 or FIG. 2, and a front lens 11, a lens 13 at the closest to the imaging device side, and an imaging device 14 are illustrated. A cylindrical lens barrel 15 is provided to cover the lens 11 and the lens 13.

When the diameter of the front lens 11 is D, an NP point 12 is located at the position where the distance LN from the lens surface of the front lens 11 is equal to 0.5D (LN=0.5D).

Figure 4:
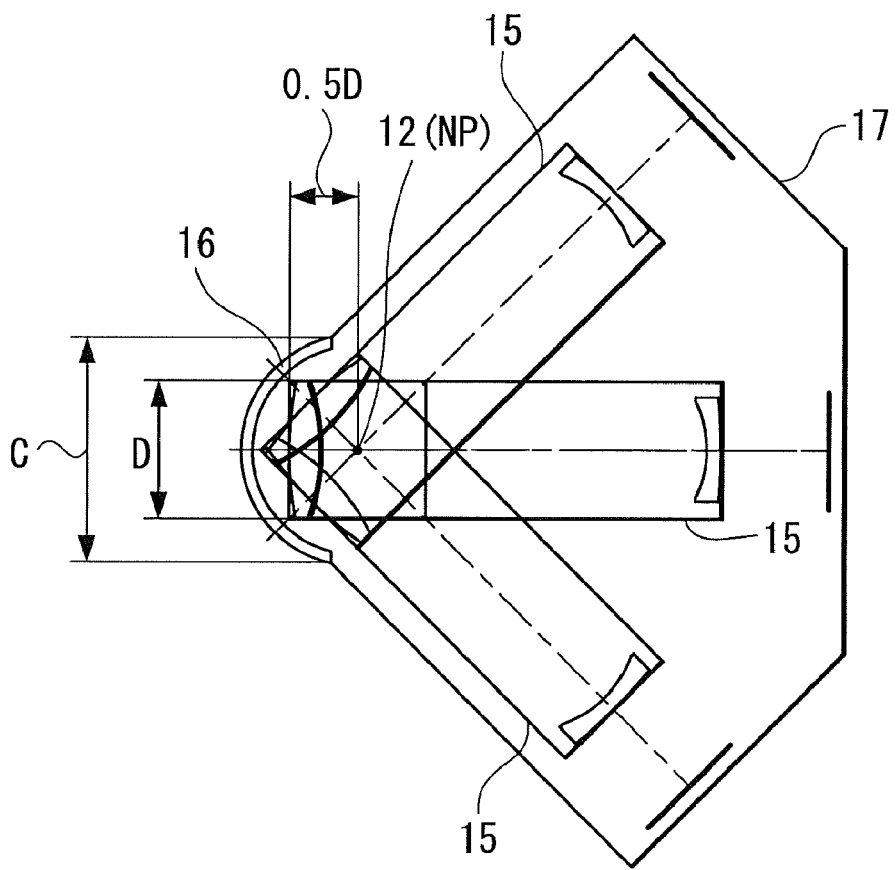
FIG. 4 is a diagram for explaining a state that a lens barrel of the imaging apparatus in FIG. 3 is rotated around the NP point.

FIG. 4 illustrates a state that the lens barrel 15 of FIG. 3 is rotated around the NP point 12, 45 deg. each upward and downward from the horizontal position.

A camera housing 17 covers the surrounding area of the lens barrel 15, and a transparent cover member 16 is provided at the front (the imaging subject side) of the camera housing 17. The camera housing 17 is configured such that the lens barrel 15 can rotate 45 deg. each upward and downward.

In the example illustrated in FIG. 4, it is suitable that the dimension C of an opening part of the transparent cover member 16 is about 1.6 times of the diameter D of the front lens 11.

In common monitoring cameras and the like, it is often the case that the diameter D of a front lens is about from 30 mm to 60 mm. Accordingly, the dimension C of the opening part of the transparent cover member 16 is from approximately 50 mm to 100 mm.

When it is desired to suppress the deterioration in the optical performance such as occurrence of aberration, etc., it is effective to use glass for the material of the transparent cover member 16.

Then, if the dimension C of the opening part of the cover member 16 is about from 50 mm to 100 mm as described above, even if the material of the cover member 16 is glass, the cover member 16 can be mass-produced at a relatively low cost.

Further, even when the lens barrel 15 is rotated 45 deg. or more, the diameter of the cover member 16 does not increase so much, and the cover member 16 can be realized relatively easily.

Figure 5:
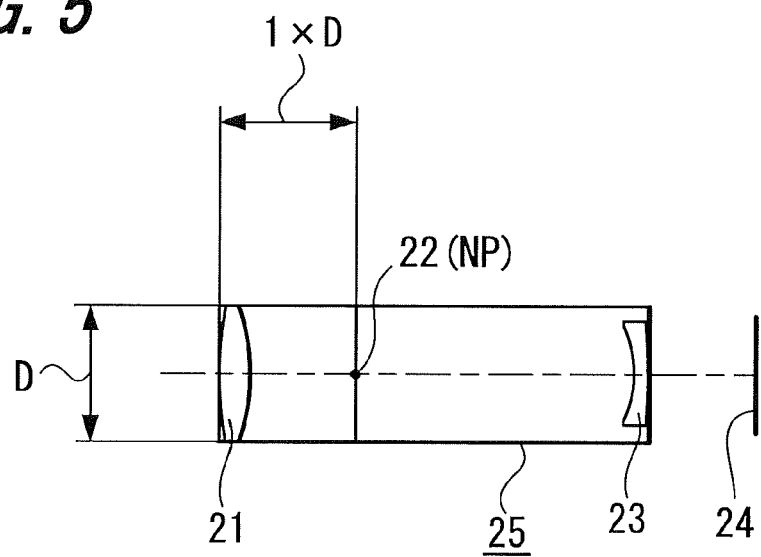
FIG. 5 is a schematic configuration diagram of an example of an imaging apparatus in which LN=D.

FIG. 5 illustrates an example of an imaging apparatus in which LN=D. In FIG. 5, the illustration of the optical system is simplified as in FIG. 3, and a front lens 21, a lens 23 at the closest to the imaging device side, and an imaging device 24 are illustrated. A cylindrical lens barrel 25 is provided to cover the lens 21 and the lens 23.

When the diameter of the front lens 21 is D, an NP point 22 is located at the position where the distance LN from the lens surface of the front lens 21 is equal to D (LN=D).

Figure 6:
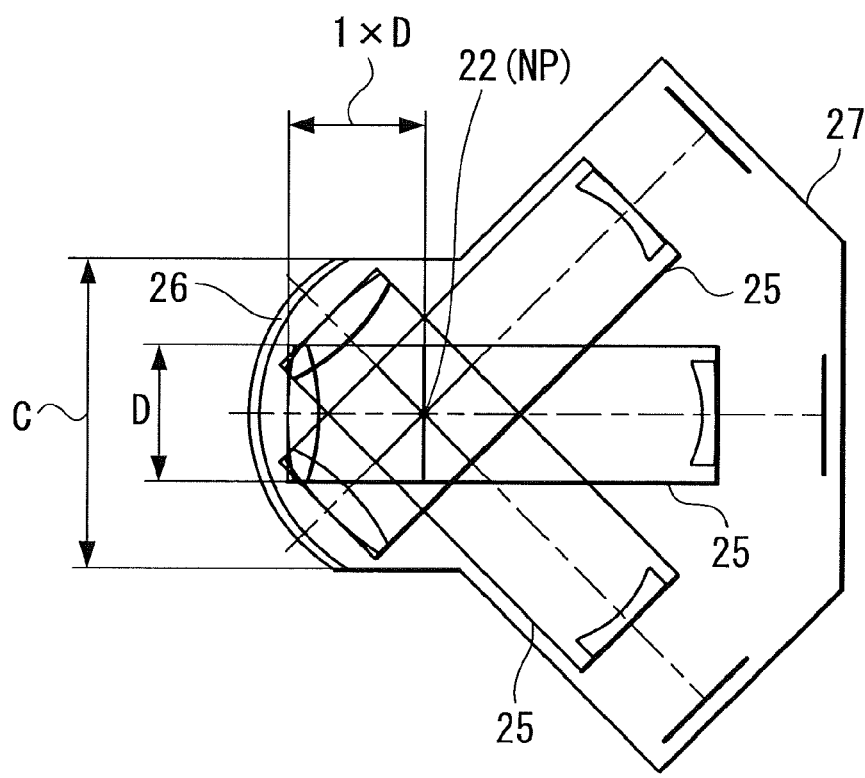
FIG. 6 is a diagram for explaining a state that a lens barrel of the imaging apparatus in FIG. 5 is rotated around the NP point.

FIG. 6 illustrates a state that the lens barrel 25 is rotated around the NP point 22, 45 deg. each upward and downward from the horizontal position.

A camera housing 27 covers the surrounding area of the lens barrel 25, and a transparent cover member 26 is provided at the front (the imaging subject side) of the camera housing 27. The camera housing 27 is configured such that the lens barrel 25 can rotate 45 deg. each upward and downward.

In the example illustrated in FIG. 6, it is suitable that the dimension C of an opening part of the transparent cover member 26 is about 2.3 times of the diameter D of the front lens 21.

In common monitoring cameras, etc., it is often the case that the diameter D of the front lens is about from 30 mm to 60 mm. Accordingly, the dimension C of the opening part of the transparent cover member 26 is from approximately 70 mm to 140 mm.

If the dimension C of the opening part of the cover member 26 is about from 70 mm to 100 mm, even if the material of the cover member 26 is glass, the cover member 26 can be mass-produced at a relatively low cost.

On the other hand, if the dimension C of the opening part of the cover member 26 is about 100 mm or greater, in particular, as it reaches 140 mm, it gradually becomes difficult to produce the cover member 26 at a relatively low cost and with high accuracy.

As described above, in common monitoring cameras and the like, it is often the case that the diameter D of the front lens 21 is about from 30 mm to 60 mm, however, particularly, there are a large number of front lens having diameters from 30 mm to 50 mm which are relatively small. Therefore, when LN=D is satisfied, the case that the dimension C of the opening part of the cover member 26 is about from 70 mm to 100 mm increases, and it is possible to produce the high-performance transparent cover member 26 at a relatively low cost.

Further, even when the lens barrel 25 is to be rotated 45 deg. or more, the diameter of the cover member 26 does not increase so much and the cover member 26 can be realized relatively easily.

Figure 7:
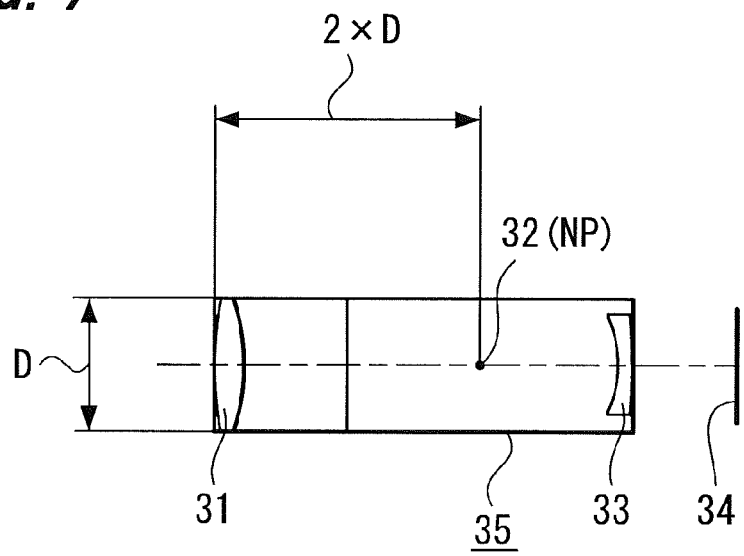
FIG. 7 is a schematic configuration diagram of an example of an imaging apparatus in which LN=2D.

FIG. 7 illustrates an example of an imaging apparatus in which LN=2D. In FIG. 7, the illustration of the optical system is simplified as in FIG. 3, and a front lens 31, a lens 33 at the closest to the imaging device side, and an imaging device 34 are illustrated. A cylindrical lens barrel 35 is provided to cover the lens 31 and the lens 33.

When the diameter of the front lens 31 is D, an NP point 32 is located at the position where the distance LN from the lens surface of the front lens 31 is equal to 2D (LN=2D).

Figure 8:
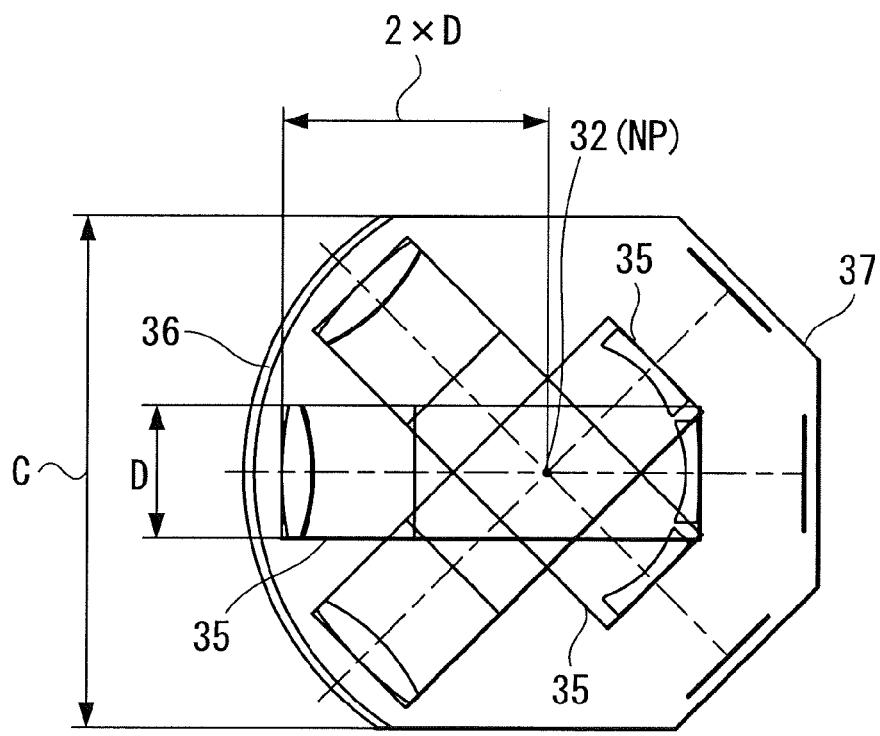
FIG. 8 is a diagram for explaining a state that a lens barrel of the imaging apparatus in FIG. 7 is rotated around the NP point.

FIG. 8 illustrates a state that the lens barrel 35 is rotated around the NP point 32, 45 deg. each upward and downward from the horizontal position.

A camera housing 37 covers the surrounding area of the lens barrel 35, and a transparent cover member 36 is provided at the front (the imaging subject side) of the camera housing 37. The camera housing 37 is configured such that the lens barrel 35 can rotate 45 deg. each upward and downward.

In the example illustrated in FIG. 8, it is suitable that the dimension C of an opening part of the transparent cover member 36 is about 3.9 times of the diameter D of the front lens 31.

In common monitoring cameras and the like, it is often the case that the diameter D of the front lens 31 is about from 30 mm to 60 mm. Accordingly, the dimension C of the opening part of the transparent cover member 36 is from approximately 120 mm to 240 mm.

If the dimension C of the opening part of the cover member 36 is about 120 mm or greater, in particular, as it reaches 240 mm, when the material of the cover member 36 is glass, it is extremely difficult to produce the cover member 36 at a relatively low cost and with high accuracy.

On the other hand, if the material of the cover member 36 is resin, which is relatively inexpensive, it occurs that the surface of the cover member 36 is easily scratched or the optical performance is deteriorated, so that the quality of captured dynamic and/or static images is deteriorated.

Further, if the lens barrel 35 is to be rotated 45 deg. or more, the dimension C of the cover member 36 is further increased and results in increased difficulty in realizing the cover member 36.

From the above, if the size of an actual imaging device, the sizes of lenses, etc. are considered, it is preferable that the formula (1) is satisfied.

In the above-described examples of the configuration of the imaging apparatus illustrated in FIG. 3 through FIG. 8, the transparent cover members 16, 26 and 36 are provided at the front of the lens barrels 15, 25 and 35, respectively.

However, the invention is not limited to such an imaging apparatus in which a transparent cover member is provided.

Here, an imaging apparatus according to another embodiment of the invention is described next, in which a transparent cover member is not provided.

Figure 9:
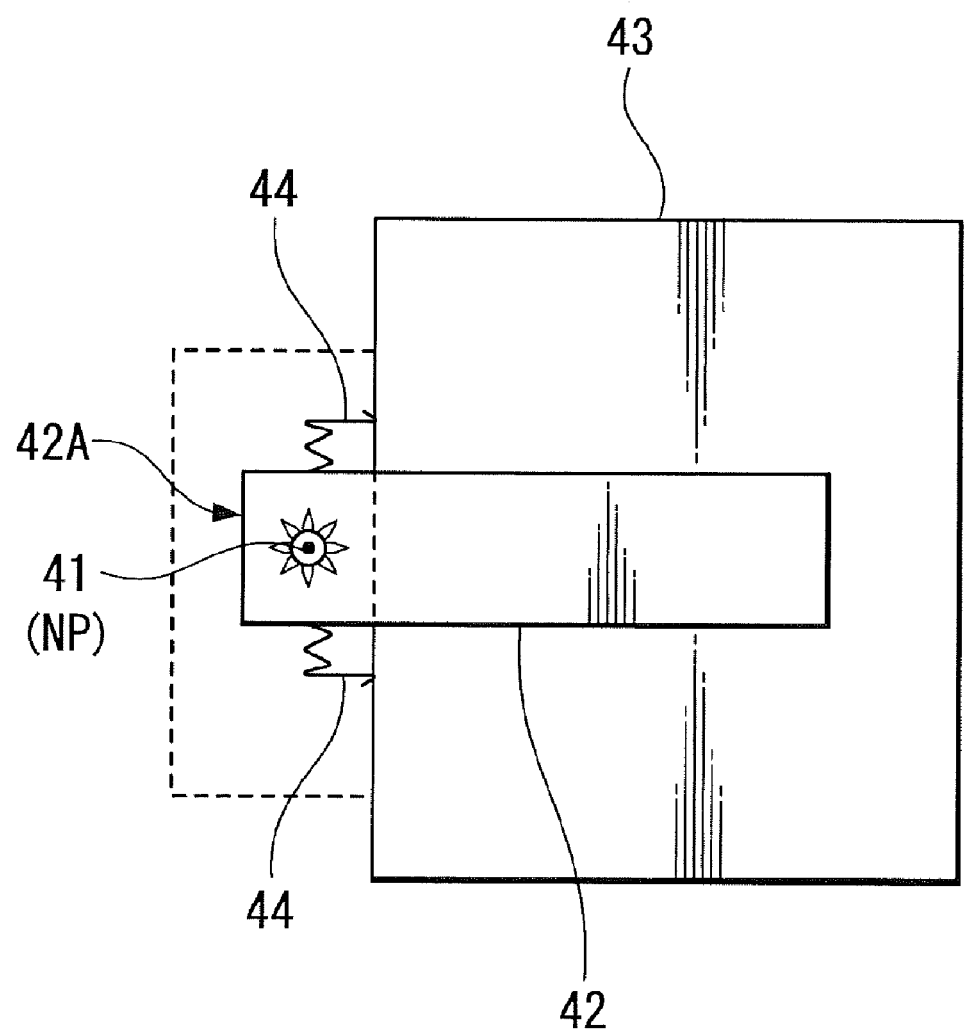
FIG. 9 is a schematic configuration diagram of an example of an imaging apparatus in which a cover member is not provided according to another embodiment of the invention.

FIG. 9 illustrates an example of an imaging apparatus according to another embodiment of the invention, in which a transparent cover member is not provided.

As illustrated in FIG. 9, an NP point 41 is located in the vicinity of a front lens (not shown), that is, at the front part (at the imaging subject side) of a lens barrel 42, and a movable part at the rear part of the lens barrel 42 is covered with a waterproof housing 43.

The lens barrel 42 is configured to rotate around the NP point 41.

Further, an area surrounded by a broken line in figure, which includes a movable part at the front part of the lens barrel 42, is made in a waterproof structure.

That is, the lens barrel 42 and the waterproof housing 43 are connected with a waterproof bellows member 44, and the connection part of the waterproof bellows member 44 and the lens barrel 42 is made in a structure that does not allow leakage of water.

The waterproof bellows member 44 is configured to freely expand and contract. Thereby, even when the lens barrel 42 is rotated around the NP point 41, the waterproof bellows member 44 follows the movement of the lens barrel 42, so that the waterproof bellows member 44 can serve the waterproof function for the connection part of the lens barrel 42 and the waterproof housing 43.

Further, gaskets are provided with screws located between lenses and the lens barrel.

Furthermore, for example, a plate member of transparent plastic, plane grass, etc. may be provided at the front of the lens barrel 42 to a surface 42A in front of the front lens to prevent entry of water, dirt, dust, etc.

By configuring the imaging apparatus as described above, it is possible to eliminate the cover member itself illustrated in FIG. 3, etc.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging apparatus comprising:
   an imaging device; and
   an optical system configured to image light from an imaging subject on the imaging device, the optical system including at least a lens and an aperture diaphragm,
   wherein,
      when NP point is defined as a point where an extended linear component in an object space of a principal ray crosses an optical axis of the optical system, the principal ray being located in a Gauss region and being selected from among principal rays passing through a center of the aperture diaphragm of the optical system,
      D represents a diameter of a lens at the closest side to the imaging subject,
      LN represents a distance from a lens surface of the lens at the closest side to the imaging subject to the NP point, and a value of the distance LN is defined as positive when the NP point is located at a point behind the lens surface of the lens at the closest side to the imaging subject and as negative when the NP point is located in front of the lens surface of the lens at the closest side to the imaging subject,
      a formula, $0 \leq LN \leq D$, for when $D>0$, is satisfied, and
      the optical system is configured to rotate at the NP point.

2. The imaging apparatus according to claim 1, wherein the optical system comprises a variable magnification optical system which changes a focusing distance and wherein a change in the distance LN when the focusing distance is changed is within 20 mm.

3. The imaging apparatus according to claim 1, further comprising a transparent cover member provided at the imaging subject side of the lens at the closest side to the imaging subject.

4. The imaging apparatus according to claim 3, wherein a material of the transparent cover member is glass.

* * * * *